United States Patent
Rebane et al.

[11] Patent Number: 5,978,567
[45] Date of Patent: Nov. 2, 1999

[54] SYSTEM FOR DISTRIBUTION OF INTERACTIVE MULTIMEDIA AND LINEAR PROGRAMS BY ENABLING PROGRAM WEBS WHICH INCLUDE CONTROL SCRIPTS TO DEFINE PRESENTATION BY CLIENT TRANSCEIVER

[75] Inventors: George J. Rebane, Topanga; Richard A. Lang, Mendocino, both of Calif.

[73] Assignee: Instant Video Technologies Inc., San Francisco, Calif.

[21] Appl. No.: 08/281,368

[22] Filed: Jul. 27, 1994

[51] Int. Cl.[6] ........................................ G06F 13/28
[52] U.S. Cl. ........................................ 395/200.49
[58] Field of Search .................... 348/7; 395/600, 395/200.49; 455/5.1; 358/86; 380/20

[56] References Cited

U.S. PATENT DOCUMENTS

| | | | |
|---|---|---|---|
| 5,172,413 | 12/1992 | Bradley et al. | 380/20 |
| 5,220,420 | 6/1993 | Hoarty et al. | 358/86 |
| 5,319,455 | 6/1994 | Hoarty et al. | 348/7 |
| 5,341,474 | 8/1994 | Gelman et al. | 395/200 |
| 5,361,091 | 11/1994 | Hoarty et al. | 348/7 |
| 5,371,532 | 12/1994 | Gelman et al. | 348/7 |
| 5,404,505 | 4/1995 | Levinson | 395/600 |
| 5,412,720 | 5/1995 | Hoarty | 380/15 |
| 5,421,031 | 5/1995 | De Bay | 455/5.1 |
| 5,440,336 | 8/1995 | Buhro et al. | 348/13 |
| 5,442,389 | 8/1995 | Blahut et al. | 348/7 |
| 5,457,739 | 10/1995 | Le Cheviller | 379/93 |
| 5,459,306 | 10/1995 | Stein et al. | 235/383 |

*Primary Examiner*—Thomas C. Lee
*Assistant Examiner*—Anderson I. Chen
*Attorney, Agent, or Firm*—Earl Mincer

[57] ABSTRACT

A system and method to efficiently deliver multimedia interactive and linear programming on a large-scale network is disclosed. The system is designed to be hierarchical in nature in order to avoid the huge processing and storage requirements of a system utilizing centralized storage and system control. The stored program material is segmented into portions and each program segment is transmitted to the receiving system component in less than real-time on an as-needed basis. Methods for efficiently using system resources such as bandwidth, storage and processing time to maintain an optimally-performing system that results in minimal latency for the end-user's interaction with the system are disclosed.

21 Claims, 4 Drawing Sheets

FSN Hub Software Architecture

SYSTEM FOR DISTRIBUTION OF INTERACTIVE MULTIMEDIA AND LINEAR PROGRAMS BY ENABLING PROGRAM WEBS WHICH INCLUDE CONTROL SCRIPTS TO DEFINE PRESENTATION BY CLIENT TRANSCEIVER

BACKGROUND OF THE INVENTION

Video Compression.

Video/audio compression techniques for motion video are becoming more prevalent in computer networks and in video-related services such as those provided by cable companies, telephone companies and satellite or fiber-optic-based service companies. To illustrate, consider the cable television companies' announcements of new cable TV networks that will provide over 500 channels due to the use of video/audio compression. As another example, in the computer industry the current buzzword is multimedia, which combines text, still-frame pictures, audio and motion video. Such systems usually employ some type of video/audio compression to reduce the data storage requirements associated with digital motion video. Standards groups are even attempting to create standards for compression techniques, such as MPEG (Moving Picture Expert Group).

ITVS definition.

To date, it is primarily the computer industry that has been the first to adopt use of multimedia. However, the advent of fiber optics and even new digital data transmission techniques over cable have prompted the cable companies and cable/telephone consortiums to begin publicly discussing new networks that will incorporate multimedia data. To further enhance today's cable TV networks, the industry has also been proposing that the user have the ability to interact with the multimedia data on these new networks. Thus, the term being used for one of these new networks is Interactive Television System ("ITVS"). It is commonly understood that an ITVS will incorporate multimedia data, however, to be precise, such a network might be termed an Interactive Multimedia Television System. In fact perhaps it is even more appropriate to delete the "Television" portion of that term making it simply "Interactive Multimedia System" since these networks will deviate substantially from the conventional medium of television. For consistency, this document will use the term ITVS although it should be clear that this term refers to an interactive multimedia network that uses multimedia data.

Some features that will be available from such an ITVS include, without limitation:

Video-On-Demand, home shopping, electronic data services, games, banking, educational programs and more. Video-On-Demand may be best compared to electronic movie rental, wherein the user may order any program at any time for viewing at their leisure with full VCR-like control. In home shopping on an ITVS the user is not subjected to the broadcaster's schedule of real-time viewing such as current systems. Instead, most likely through a graphically-oriented software interface on the TV screen, the user is guided to the merchandise of interest wherein photographs and motion videos of the item may be viewed and the merchandise may be ordered. Games such as those compatible with the popular Nintendo and Sega models will also be offered electronically and interactively, possibly including interacting with other remotely-located players. Electronic banking, database services and interactive educational programs are also envisioned.

Burst transmission.

As can be seen from the previously-discussed features of such a system, motion video and audio is a major component of the multimedia data. Even in today's compressed formats, the quantity of data for digital compressed video is substantial. This is further complicated by the other types of multimedia data (text, pictures and so forth) as well as the interactivity. Research has shown that all of this precludes a practical system that would deliver such data to the user in real-time. For example, it is costly and inefficient to develop a system that processes and delivers to hundreds or thousands of users just enough data for a digital compressed movie from a library of thousands of stored programs in a Video-On-Demand application, in realtime, as Users watch the program. Instead, the multimedia data should be segmented into portions of the entire program and burst-transmitted to a buffer at or near the user for use at their leisure. The advantages of such a burst-transmission delivery over a real-time system are numerous and will become clear as the description of the present invention progresses.

Difference between a data network and an ITVS.

The design of an ITVS and it's data-handling processes are significantly different from conventional data networks. The present invention addresses the special 5 requirements of a system that incorporates interaction with multimedia data. Of paramount importance is the time element associated with the use of such data. Due to the users' interacting with the system and the time-dependent data such as video and audio, the timing for servicing user-based requests becomes critical to the satisfactory performance of the system. This is in contrast to current data networks. In a conventional data network for example, it is of little consequence if a file transfer requires 2 seconds or 2.5 seconds. However, that 0.5-second difference in an ITVS could very well result in the interruption of playback of a motion video, thus interrupting the playback for 0.5 seconds with a frozen frame on the screen or even worse, random noise. Thus, the present invention describes a system where such time-critical operations are efficiently addressed.

Lang patents.

The Lang patents (U.S. Pat. Nos. 4,963,995, 5,057,932, and 5,164,939) have taught the use of video/audio data compression to deliver video programming in less time than that required to view the program. In other words, Lang has taught that rather than using compression to achieve more real-time channels in a given bandwidth, that compression and bandwidth may be used to burst-transmit the material for viewing and playback control at the user's convenience. Lang does not address the inherent difficulties in an interactive multimedia system, especially one that is designed for a large user base.

Yurt patent.

Yurt (U.S. Pat. No. 5,132,992) has taught a general method for accessing multimedia data from a central library, specifically by using a unique ID imbedded in the stored, compressed, multimedia data of the library. Yurt has taught one method of ordering, accessing and transmitting the requested multimedia data without addressing the unique problems of managing a multi-user network for ongoing interactivity with a multimedia library of data.

The present invention is a system architecture and its related suite of data handling processes.

Thus, prior art teaches a new utilization of video/audio data compression for burst transmission and a method for identifying and retrieving selected programs. The present invention defines a total system architecture and a set of data handling processes which address the unique problems of large-scale interactive multimedia networks. Using a distributed control architecture, predictive software based on stochastic models, segmentation and burst-transmission of said program segments, and dynamic coupling between subsystems, the present invention describes a full-featured, efficiently-functioning ITVS.

Dialog Segmentation and Segmented Bursting

A key aspect of the present invention is a new ITVS data handling method that includes segmented burst transmissions. Bursting of a block of data to a 'black box' is said to occur when it takes less time to receive and store the bits than it takes to 'consume' (use) them in or via the black box. For example if all the bits representing a 120-minute movie are received by the Client set-top box (the Client represents the end-user component) in a ten-minute burst then we say that bursting has taken place with a Burst Factor ('BF') of 120/10=12. BF is a measure of such resulting temporal compression and benefits multiplicatively from the transmitted bits first being spatially compressed by any one the many existing algorithms, such as MPEG. Therefore if the movie were spatially compressed at 100:1 prior to transmission, it would take ¹⁄₁₀₀th of the time for the Client box to receive them thus resulting in a Burst Factor of 1200. The same arguments hold for audio data and in extension, data representing any multimedia program. As another example consider the case of an interactive program, such as a video game. If it takes 30 seconds to download into the Client and the User averages 10 minutes to play the game, then bursting has occurred with BF=(10 minutes×60 seconds/minute)/30 seconds=20. This new and generalized concept of bursting can be applied to all types of receivers of transmitted materials for which the time to receive and the time to consume can be defined. Such receivers, of course, must have the ability to store the bursted transmission.

The alternative data handling method, which is well-known and over which the present invention claims distinct advantages, is transmission via bit-streaming wherein the incoming bits to a 'black box' are received and immediately consumed at the same speed at which they are received. Such a method has Burst Factor of 1, i.e. there is no burst transmission. Bit-streaming is the mode of operation for the existing class of massively-parallel video servers such as the Oracle Media Server from Oracle Corp. Such devices are being designed into some of the currently-discussed 500-channel cable TV systems. Such bit-streaming systems may be seen as simply digital versions of the analog transmission systems which are currently employed by cable TV distributors.

Bursting an entire linear program (e.g. movie) or interactive application is termed 'comprehensive bursting'. In the previously-discussed example, the spatially-compressed 120-minute movie would be comprehensively bursted in a six-second transmission. If such a movie is represented by one GigaByte (1 GB) of data, then the Client system must provide for that amount of storage. Depending upon the design of such a comprehensive-burst system, the entire movie may need to be stored before playback (consumption) may begin. For a number of reasons it can be shown that dividing a large program or interactive application into smaller, logically or semantically compact segments yields economic benefits and improvements in quality of service to the User. Therefore, the present invention teaches the pre-segmenting of program materials and interactive applications, and the transmission of such data in a 'segmented burst' mode.

The benefits to ITVS operation from segmented burst data handling are many. Primarily it permits the reduction in redundant storage costs at all store/forward nodes in the ITVS. A Hub connected to many Client systems can store the initial segments of many more movies and applications more economically than having to maintain a comprehensive inventory of all available interactive products. For example, when a User requests a particular movie its initial segment can be quickly downloaded with minimum start-session latency. This is due to the minimized Hub transmit cycle time, which is the time required to cycle through the request for all waiting online Clients. This cycle time is minimized due to the smaller segments that are quickly burst-transmitted to the Clients. After initiating the User session the Hub will then place a timely order or sequence of orders to the Bunker for additional segments based on current Hub memory availability and operating policy. Thus, segmented bursting supports 'just in time' ordering, inventorying and transmission to provide similar benefits that 'just in time' ordering, inventorying and servicing provides in established commercial operations.

Segmented bursting is seen to maximally unload the upstream nodes from incremental User demands while the 'program bits' are being consumed at the Client system. This is another fundamental concept of the present invention namely the ability to maximize the autonomous operating periods at every store/forward level in the system. This is achieved by every store/forward node locally assessing upstream availabilities in concert with the predicted needs of its downstream nodes. For example, in home shopping a User may wish to see sweaters from Sears. The 'Knitwear' portion (termed here as a 'web fragment') of the Sears interactive catalog would be segment-bursted to the Client in a few seconds and then consumed by the User in perhaps fifteen minutes. Based on knowledge of User demand and intra-application branching the Hub could prepare for the most-likely User demands by pre-ordering from the Bunker and Sears online services the presentation assets (which are the video, audio and data components of the interactive multimedia program) for pants and shirts, for example.

This illustrates another important aspect of the present invention, namely the ability to order and assemble the dialog segments or web fragments 'just in time' at the lowest possible downstream store/forward level in the ITVS. this permits the efficient storage and fast transmission of only the dialog components needed that respond to thousands of individual and concurrent User demands. Such a data-handling method also provides for maximal reusability of all dialog components, especially the costly video and audio presentation assets. These benefits are obtained without having to store all materials at the Hub (or any other) level and then remain online with a dedicated channel responding to every User interaction during an interactive session.

Thus it is seen that the invention will allow the assembly and integration of a very large scale ITVS consisting of several layers of store/forward nodes that can be operated by different commercial enterprises specializing in their own interactive product or service. Furthermore the entire ITVS can be made to operate without requiring the storage of all user-available inventory at any one node at any given time and the further requirement for all knowledge about the state of the system to be contained at any one central location. This ability to effect distributed control with only local knowledge will reduce ITVS's complexity and cost, and increase the ability to provide large inventories of interactive products and services at high quality of service levels to the end User.

SUMMARY OF THE INVENTION

Hierarchical, distributed, system as opposed to central storage and control.

A fundamental aspect of the present invention is the hierarchical design of the system. The system is designed as network of store and forward (store/forward) nodes. Such a system may be modeled by a polytree topology [Pearl 1989]. To understand the advantages of such a system, consider the alternative, which is a centrally-controlled system with central storage of all the multimedia programming materials. With the video portion of the multimedia being the overwhelming factor in terms of storage space and in time-critical delivery, one can see that a large-scale centrally-controlled system will result in several unwieldy issues. First is the prohibitively expensive storage cost. Consider that a single ITVS is likely to span more than one owner and more than one industry. For example, movie studios are likely to have their own libraries; the network operator may be a different entity than the library operator; a large-scale ITVS has portions of the network operating as everything from MANs (Metropolitan Area Networks) to LANs (Local Area Networks); and there are a multitude of service providers for Video-On-Demand, banking, home-shopping, education, and so forth. Therefore, one difficulty in a central storage and control scheme is that although the ITVS spans many entities, only one would bear the cost of the huge storage requirements. Furthermore, this cost is duplicated for every several thousand users, compounding such high storage costs. This factor alone results in a strategic necessity to distribute the storage.

Additionally, very significant processing and control issues arise in a central control scheme. Keeping in mind that the system is interactive and has thousands of simultaneous users, one can quickly see that central control results in enormous processing requirements and the need for extremely high-performance storage devices. For these reasons, and others that will come to light, the present invention distributes the data and the control throughout the system in a hierarchy of store/forward nodes. This results in a much more strategically cost effective and manageable system. It further results in a system wherein system usage, data handling, and other system performance issues may be more readily predicted and controlled.

Distributed control & dynamic coupling.

The hierarchy of a preferred embodiment of the present invention will be used to illustrate the distributed control, dynamic coupling and iterative nature of the system. The hierarchy of the system includes the following physically-distinct store/forward nodes: Data Studios; Bunkers; Hubs; and Clients. Briefly, since these nodes will be described in more detail in following sections, the Data Studios are where the interactive multimedia programs are prepared for online distribution; Bunkers include the primary mass storage for the system as well as online supply storage for the Hubs; Hubs include the primary online, fast-response storage for the Clients; and Clients are the set-top boxes at a home or business.

First, one can note the iterative and distributed nature of the system. The reader is advised to refer to FIG. 1 for reference while considering the following example. Consider the case where, through interaction with the Client set-top box, the User needs a video segment that is not stored at the Client. Upstream, the Client knows only of the Hub and requests such a segment from the Hub. Due to the predictive nature of the system (which will be covered later), the Hub is likely to have the needed segment and satisfy the request, with the remainder of the network happily ignorant of the request. On the other hand, if the Hub can not satisfy the request, it makes the request upstream to the Bunker. Here we see the iterative nature of the system, as the Hub is a client to the Bunker just as the Client is a client to the Hub.

Furthermore, when the Bunker satisfies the request and passes the video segment to the Hub, the Hub is now in a position to satisfy the Client's request. In fact, as far as the Client is concerned, there is nothing upstream beyond the Hub—the Hub is all-knowing, satisfying every request the Client has. Similarly, the Bunker thinks that there is nothing downstream besides the Hub, the Hub thinks there is nothing upstream besides the Bunker, and so forth. To gain further efficiencies, the Hub may itself have at least one more layer of internal store/forward nodes.

So, as shown in the previous example, control of the system is distributed. Instead of centrally-located storage, processing and control, these functions are distributed throughout the entire system with requests being passed upstream and downstream as needed. Furthermore, the system is dynamically coupled. For example, the Hub communicates upstream with the Bunker only as needed. The system of the present invention is also iterative and structurally recursive, as described in the preceding scenario.

Other major features: proactive tasks, segmented burst transmissions.

Another major feature of the system is that it is proactive, as opposed to reactive. That is, since the system is distributed and dynamically coupled, the store/forward nodes can use spare processing time and channel bandwidth for proactive tasks that can predict system requirements and make adjustments accordingly. The details of these proactive modules will be explained later. At this point, it must be pointed out that the present invention includes proactive modules that predict system usage for the various applications, predict needs of program segments prior to the actual downstream request based ultimately upon specific interactions, and dynamically modify the interconnection between nodes to avoid bottlenecks in the network (also an example of dynamic bandwidth utilization).

Also, as mentioned previously, all of the aforementioned is made possible by physically and logically segmenting the multimedia programs. This segmentation is not indiscriminate. To understand how the programs are segmented consider the structures of multimedia dialog webs. In preparation for the following discussion keeping in mind that the use of the system is interactive—imagine interactively playing a video game; or interacting with home-shopping by flipping through still pictures of selected products and then viewing videos of those that interest you; or watching a movie from the Video-On-Demand feature, controlling the playback with pause, rewind and fast-forward.

Segmentation of multimedia dialogs.

As is understood in Multimedia, a Dialog consists of three basic parts: the control script or program, the presentation assets and the processing engines. The control script is the actual computer code that controls the operation. In the foregoing example, the control script is the software that defines how the information is presented on the screen, where the User can go (or navigate to) next, and so forth. The presentation assets are the multimedia data, such as the still pictures, textual information and audio)video sequences. Last, the processing engine is responsible for special processing of the presentation assets when necessary. This might include decompression for notion video, for example, so that video program may be played back.

The logical structure of these dialogs are formally envisioned as a Web (technically, a directed cyclic graph). The reader is referred to FIG. 2 for reference. Webs are designed for interactive multimedia applications. The dialogs and the user-interaction for a particular application are well understood. Nodes of the dialog are semantically grouped together and paths defined between nodes. Therefore, the user interaction with any given application is defined by this design.

Such segmentation of the program is built into the design of the interaction for that application. This permits segments to be burst-transmitted to the Client as needed with that Client 'consuming' or using that program segment or web fragment over an extended period of time relative to the burst transmission. It also contributes to the predictive aspect of the previously-discussed proactive modules. For example, in the design of the dialog, the designer may predict average web-fragment dwell times, that is the extended time during which the User will utilize the dialog segment.

A SUMMARY

To summarize up to this point, the present invention solves the unique problems associated with a large-scale ITVS, which differ significantly from standard data networks due to the structure of interactive multimedia data and the nature of User-sessions. The system described is a distributed network of intelligent store/forward nodes. It is designed to be hierarchical and recursive in structure and may be formally modeled as a polytree. This facilitates the use of distributed control, processing and storage throughout the network. This in turn results in an efficient dynamic system that is able to locally predict and control system performance. The basic unit of transmission is a segment or logical portion of a program which is burst-transmitted as needed (reactively) or as predicted (proactively). This segmentation is based upon a logical or semantical division dictated by the interactive use of the dialog or interactive multimedia applications program. All of this results in an efficient ITVS that satisfies the constraining and conflicting criteria of such a system—maximum inventory of programs and services, minimum latency for user interaction and minimum cost.

OBJECTS OF THE INVENTION

It is an object of the present invention to provide a system architecture and data handling method for supporting multiple, concurrent interactive multimedia sessions including the burst delivery of digitally compressed audio/video programming over large-scale networks such as interactive television systems.

Another object of this invention is to provide such a system and method to support such interactive sessions by segmenting the program contents and delivering each segment in a time interval that is less than the time interval required to use or consume the segment's audio, video, or dialog web fragment content.

Another object of this invention is to provide such a system and method by segmenting the program contents in order to distribute storage throughout the system resulting in cost-savings and reducing redundant storage components.

Another object of the invention is to provide such a system and method wherein the segmenting of the program content is not apparent to the end User while providing for interactive control and continuous audio/video playback.

Another object of the invention is to provide such a system and method that can be easily maintained and kept operating at peak performance and economical efficiency through the implementation of intelligence and control functions distributed throughout the network of store-and-forward nodes.

Another object of the invention is to provide such a topology of store-and-forward nodes assembled in modular and recursive structures that enable the use of local knowledge and control processes at each node to provide for efficient and cost effective overall system operation.

Another object of the invention is to provide such a system and method in which modeling of downstream demand and upstream response processes are used to dynamically reconfigure system components and operations for efficient usage.

Another object of the invention is to provide such a system and method by which end User quality of service is enhanced through distributed intelligent modules at the node level, performing proactive functions such as look-ahead processing and local resource load-leveling.

Another object of the invention is to provide such a system and method of designing interactive applications and linear programs to enable their dynamic storage and transmission in segments throughout the network as a function of both reactive (responding to User demand) and proactive (preparing for anticipated User demand) modes.

DESCRIPTION OF THE PREFERRED EMBODIMENT

Figure 1:
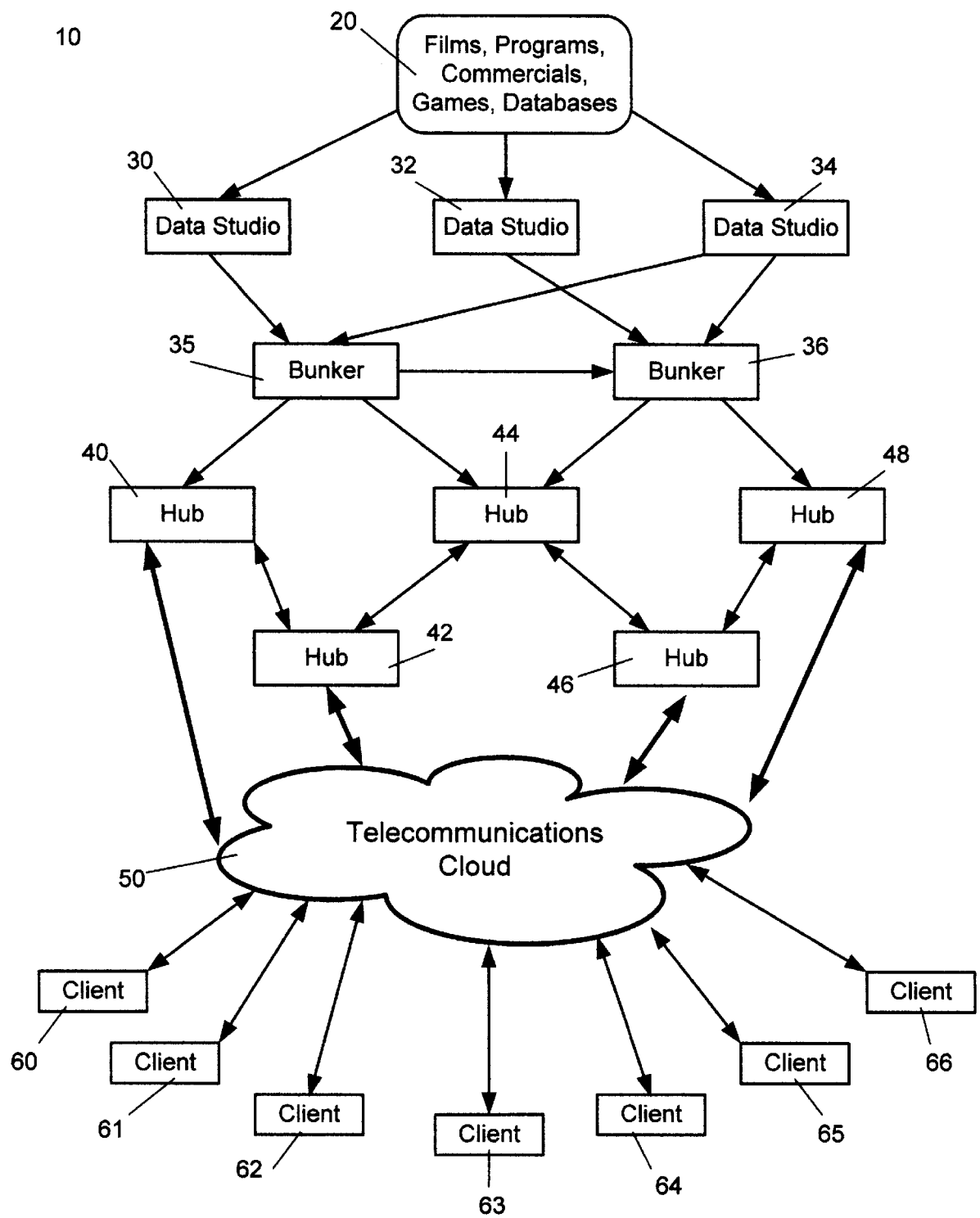
FIG. 1 is a high-level block diagram of an ITVS and associated components that implement the system and method of the present invention.

FIG. 1 depicts a typical ITVS, 10. It includes the source material 20; one or more Data Studios 30, 32, and 34; one or more Bunkers 35 and 36; one or more Hubs 40, 42, 44, 46, 48; the Telecommunications Clouds 50; and one or more Clients 60 . . . 66. The source material 20 comes from a variety of sources and includes movies, television programs, commercials, multimedia games, databases and more. In short, any type of information which may be digitally encoded is viable source material 20. Source material 20 may be in any form that at least one of the data studios 30 . . . 34 is able to convert to a digital form or is capable of accepting in an already-digital format. This means, for example, that movies and programs may be received at data studio 30 . . . 34 in a variety of analog or digital formats including film, VHS tapes, Betacam, D2, and so forth.

Data Studios

Data studio 30 . . . 34 performs all preparation and 'file wrapping' of source material. This preparation includes Dialog design, control script authoring (programming), presentation assets production, dialog integration with presentation assets, editing, annotation, encoding and data compression. The Web is created by designing and appropriately programming the Control Script. Finally, any necessary processing engines are added and all of these components are integrated into a completed, wrapped and segmented program.

It is important to note that the annotation may include data that is not content-specific such as network-related data and more. This includes, without limitation, file length, file origination location, web dwell times, segment size and so forth. Also, while Data Studio 30 . . . 34 is intended to be the primary source for file-wrapping, this process may also take place at other nodes in the system. For example, the previously-mentioned network-related data may be added or modified at various nodes.

Figure 2:
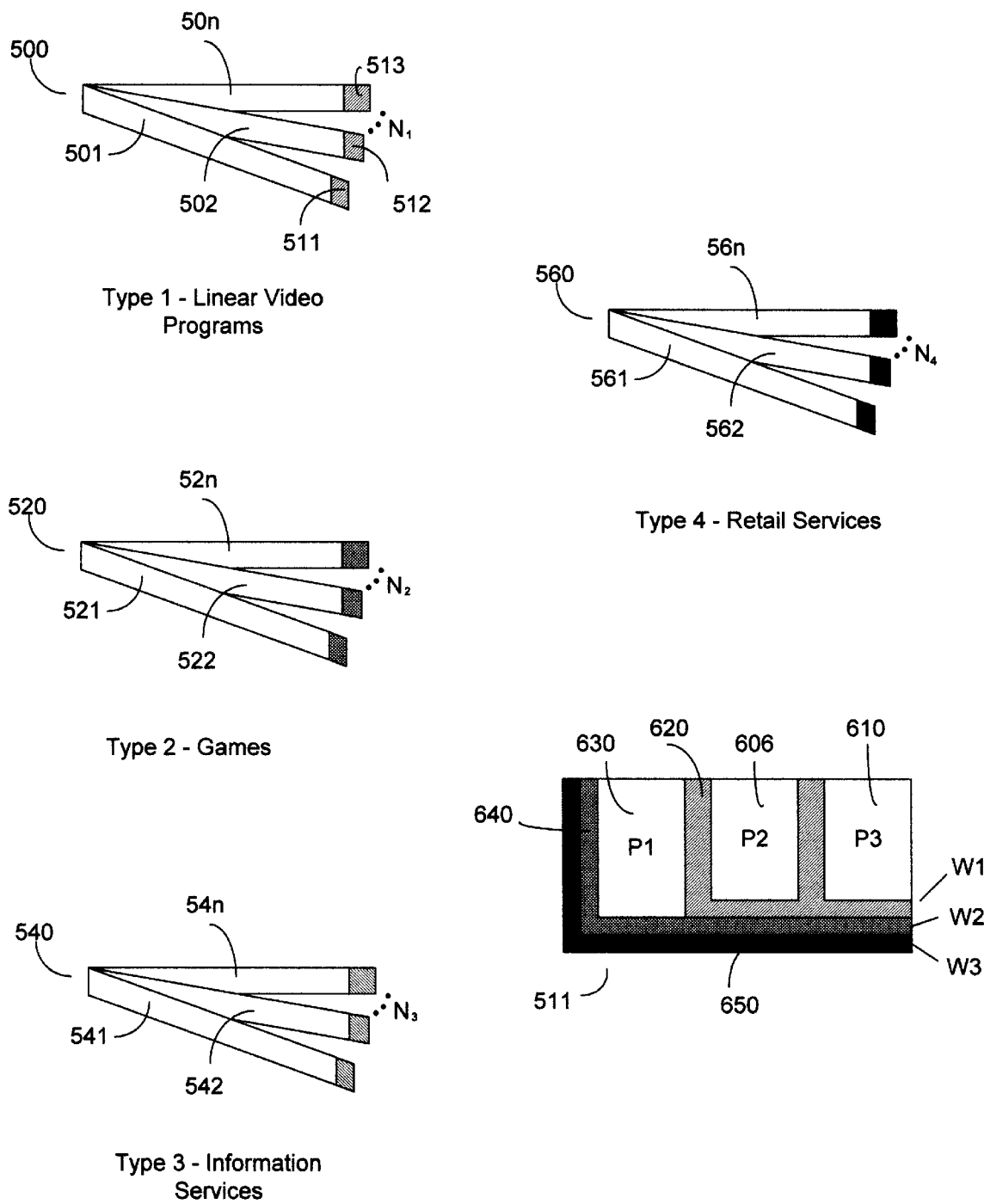
FIG. 2 depicts the structures of multiple interactive multimedia programs, Web fragments and how Web fragments are wrapped (encapsulated with meta-data).

FIG. 2 depicts one embodiment of the segmentation and wrapping of a Web. Several types of Applications are shown:

Application 500, Application 520, Application 540 and Application 560 each represent a different type of ITVS application such as, without limitation, video programs, games, information services and retail services. Each Application 500, 520, 540 and 560 is made up of many Programs 501 . . . 50n, 521 . . . 52n, 541 . . . 54n, and 561 . . . 56n. Programs 501 . . . 50n in the present example would each represent a movie. In turn each program, using Programs 501 . . . 50n to illustrate, is made up of many Web Fragments 511, 512, 513 and so forth. To avoid confusion, the remaining Web Fragments are illustrated in the figure but are not numbered.

FIG. 2 also illustrates how a single Web Fragment 511 is wrapped with various layers of information. As an example, consider the case of a home-shopping (retail services) application. To borrow from an earlier example, perhaps the User is viewing sweaters from the Sears Online services catalog. The squares labeled P1, P2, and P3 are the payloads of the Web fragments, i.e. the Presentation Assets and associated data. For example Payload P2 600 and Payload P3 610 may be still video images of selected sweaters. Perhaps metadata is included in each payload at this level, such as cost and catalog number. Note that Payload P2 600 and Payload P3 are depicted as 'wrapped' by a common area, Wrapper W1 620. Such a sample wrapper may detail the still image information about the payload, such as image resolution, data format and so forth. Also note the presence of another Payload P1 630. This payload, for example, could be videos of the sweaters being modeled. At the next level outward, there is Wrapper W2 640, which wraps all three payloads. Such a wrapper might define the fact that all that it contains are payloads about sweaters (two pictures and a video, in this example). And at a still higher level is Wrapper W3 650, indicating perhaps that its entire payload is data from the Sears Online catalog, and that the entire Web fragment is the following specified file size and so forth.

Having now illustrated how the dialogs are structured and wrapped, we return to FIG. 1 for reference. After file wrapping by data studio 30 . . . 34, the metafile is transmitted or moved to bunker 35 . . . 36. Bunker 35 . . . 36 serves as the off-line storage for the system; it archives the prepared movies, games, programs and so forth. Hub 40 . . . 48 interacts with Bunker 35 . . . 36 whenever the Hub's local storage requires updated material to respond to a client's request. Bunker 35 . . . 36 also provides security and audit trails for the stored metafiles, which are the intellectual property of their creators such as film, television and publishing companies. It is anticipated that some of these Bunkers will be owned and operated by these companies while others might be shared by many repositors who pay fees for the storage and distribution of the various linear and interactive products.

Hub 40 . . . 48

Figure 3:
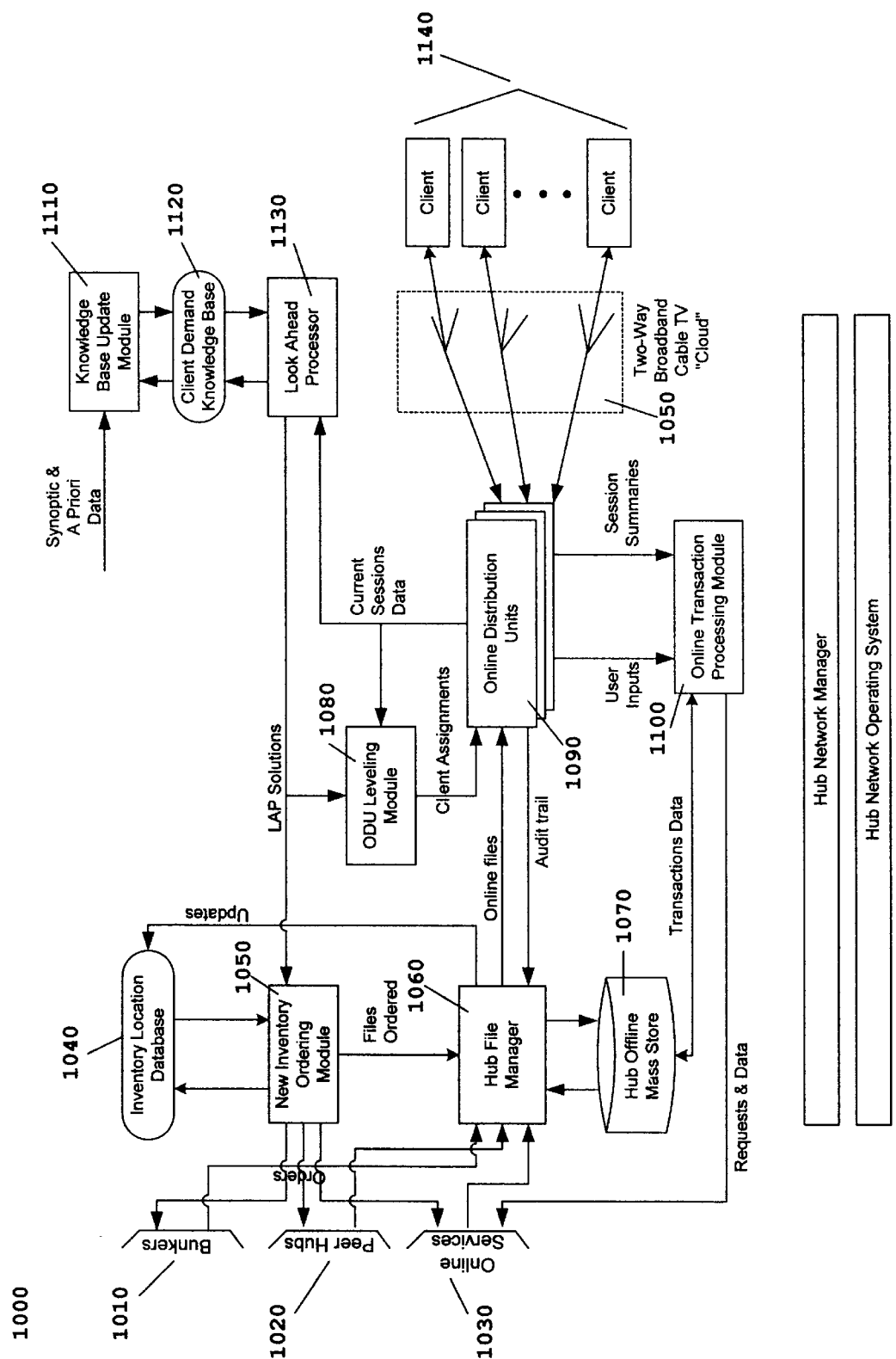
FIG. 3 illustrates the major software modules for the Hub.

Hub 40 . . . 48 receives and responds to User requests for programming from a very large subscriber base. Consequently, hub 40 . . . 48 is constantly receiving new requests from other parts of the system, is receiving interactive user requests or must simply transmit the next sequential segment to maintain a continuous playback for the Client 60 . . . 66. A summary of the key soft ware modules for hub 40 . . . 48 best illustrates it's functions. FIG. 3 depicts the interrelation of the major software modules and associated data.

Referring now to primarily to FIG. 3 and secondarily to FIG. 1, Hub 40 . . . 48 of FIG. 1 may need to update it's local inventory of files for several reasons. Most simply, the user may request a program that has not been anticipated, in which case Hub 40 . . . 48 is caught 'off guard' and must update it's local inventory to satisfy the request. For example, through the User's interaction with one of Client 1140, a particular video segment may be required. This request is transmitted back upstream through ITVS cloud 1150 to one of ODU 1090.

Under more typical conditions, user requests are anticipated through the use of client-demand and dialog-branching knowledge bases, which will be explained in more detail shortly. Hub 40 . . . 48 is also able to anticipate which segments of a file will be needed as the user interacts with the material. This predicted need is based upon a stochastic process and is statistically accurate for a large sample size. However, by definition, an unpredicted segment will sometimes be required due to the interaction of the user. In this case also, hub 40 . . . 48 must update it's inventory since the unpredicted segment had not been stored locally. This inventory ordering software is relatively simple. Basic database software would suffice. The system simply requires software to keep track of what material is stored locally via inventory location database 1040 so that if it is not 'in stock' it may be transferred using new inventory ordering module 1050 from Bunker 35 . . . 36 of FIG. 1 (which is equivalent to Bunkers 1018 Of FIG. 3) to Hub 40 . . . 48. For such a case, the immediacy of that transmission dictates that a FIFO queue not be utilized, as would be common practice in standard data networks. Instead, one solution is to use task prioritization to ensure just-in-time delivery of the required segment.

There are several types of files which are moved to and from Hub 40 . . . 48. As previously stated, a hub will occasionally need to update it's inventory via new inventory ordering module 1050. In another example, an ITVS may interconnect one or more hubs as peers as depicted by peer hubs 1020. In such a case, there may be occasion to share files, Hub to Hub. Another type of file that hub 40 . . . 48 manages is the data for transaction processing. These files update customer accounts and billing information as processed by well-known online transaction processing software [such as that offered by the Oracle Corporation of Redwood Shores, Calif.]. Other file types include data files from electronic data services such as banking and databases, and hub audit trails that store information regarding the operation of the hub. All of these files are managed by the hub file manager software, which is ordinary file management software that maintains these files on hub offline mass storage system and routes the files to the other appropriate modules as needed [such as that offered by the Oracle Corporation of Redwood Shores, Calif.].

Telecommunications Clouds 50

Referring once again to FIG. 1, Hubs 40 . . . 48 are connected to the Telecommunications Clouds 50. As is well understood in the art, the term telecommunications cloud is transmission infrastructure between any two layers of nodes. As such, it is likely a collection of communications technologies, such as fiber, coax cable, satellite, telephone lines and more. The telephone system, for example, is clearly a telecommunications 'cloud' in that it uses many transmission technologies and could not be properly described with one specific type of transmission technology. Telecommunications Clouds 50 may be provided by any entity such as a telephone company, cable TV company, satellite service provider and so forth. Telecommunication clouds 50 may be composed of one or more of these network service providers and may or may not be interconnected.

Clients 60 . . . 66

Finally, many Clients 60 . . . 66 are connected to Hub 40 . . . 48 via Telecommunications Clouds 50. Clients 60 ... 66 represent the end-user equipment in a home or business. The user interacts directly with Client 60 ... 66. This interaction is realized through graphical interactive software and a device such as a remote control. Many companies are actively pursuing such software and interactive devices, some of which are already commercially available [Scientific Atlanta, Silicon Graphics). The hardware implementation for Clients 60 ... 66 is likely to consist of a processor, memory and storage device, very much like a low-end multimedia PC, at least including a microprocessor, hard disk, one or more Megabytes of RAM, and a video card for display. It is via Telecommunications Clouds 50 that the Hubs 40 ... 48 provide program segments as needed to Clients 60 ... 66. Client requests for new segments, account information and so forth are all transmitted between Clients 60 ... 66 and Hubs 40 ... 48 through Telecommunications Clouds 50.

Look-Ahead Processing

Due to it's large user base, the User-demand and system response transmissions, an ITVS can be stochastically modeled. Similar in concept to the telephone companies' modeling of demand, this modeling is used to predict user demand for services and other ITVS performance parameters. A knowledge base is built up of demand for services at various levels. At the highest level, statistics will predict when particular services will be most used, such as electronic banking, movies on-demand, or games. Further market information will be used, such as the most-requested movies or games. At another level, further modeling can predict how the user will interact with the material. For example, if a user is going to cancel a movie they've ordered, it would likely be for a reason such as the realization that they've already seen that movie. After a certain threshold of time, the viewer is highly likely to view the movie in its entirety. All of this information is gathered and managed resulting in a client-demand knowledge base. Off-the-shelf database programs and well-known mathematical models may be used to realize these tasks. [Example KnowledgeBase: products available from IntelliCorp of Mountain View Calif.]

While the client-demand knowledge base can predict User demand, a deeper level of prediction is also needed. In an optimal ITVS content files must be segmented for the reasons previously presented. Since an ITVS offers varying degrees of interactivity based upon the particular service or product, a further complexity is added. By it's very nature, interactivity is unpredictable to some degree. The aforementioned modeling software offers the system a statistically accurate prediction of the general services, selected titles and typical usage of a particular service. This gets us 'in the ballpark', in a sense. Since all material is segmented and the use of that material is not entirely predictable due to the interactivity, the system must constantly look ahead to predict which segments are most likely to be needed next.

This problem belongs to a class of high combinatorial problems. It is directed to optimally pre-fetching and pre-setting as much data as possible, based upon stochastic predictions. An optimal solution minimizes the risk of pre-fetching data that won't be used and maximizes the amount of prefetched data that is used, in spite of the stochastically predictable but unknown requests for the data. This 'Look-Ahead Processing' or LAP solution enables the system to predict near future data handling requirements, thus minimizing user-perceived latency within available memory constraints. A solution to such a class of software problems is discussed in detail in the Ph.D. dissertation "A Class of Decision Policies for Optical Disc Access and Dynamic Memory Management During User Interaction" (George Rebane, UCLA 1990). As one example, these LAP solutions are used to determine Hub inventory shortfalls and order new media inventory, as previously discussed. LAP is, in general, used at all levels of the described ITVS architecture.

FIG. 4, Hub 100

Figure 4:
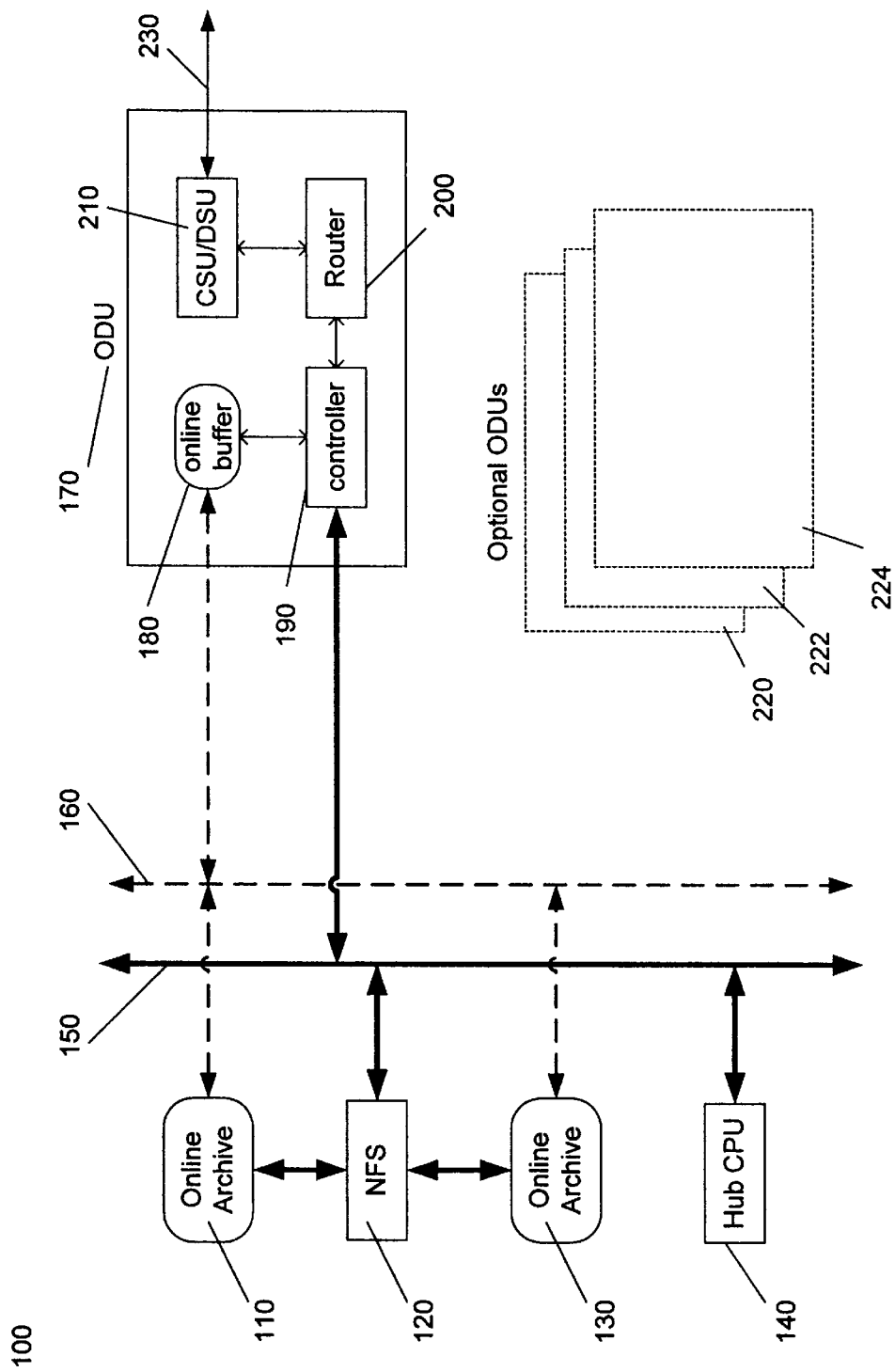
FIG. 4 is a high-level block diagram of the Hub.

FIG. 4 depicts a typical Hub, 100. This includes Online Archive 110, NFS 120, Online Archive 130, Hub CPU 140, System Bus 150, Data Bus 160, ODU 170 and one or more additional (optional) ODUs 220, 222, and 224. ODU 170 and any additional ODUs include online buffer 180, controller 190, router 200, CSU/DSU 210 and telecommunications line 230.

Online Archives 110, 130

Online Archive 110 and Online Archive 130 are redundant storage devices for Hub 100. Since Hub 100 serves Clients 60 ... 66 with program segments as needed, it is essential to provide this redundancy in case of storage equipment failure so that Clients 60 ... 66 will not be affected and program viewing will remain seamless to the user at Client 60 ... 66. Online Archives 110 and 130 are most likely large capacity (near Terabyte) computer hard disk drives. As appropriate, however, these storage devices may also be implemented using other storage means, including without limitation, optical disks, RAM, digital tape devices, and so forth. These storage devices should be selected based upon their ability to maintain the required data rate for feeding Clients 60 ... 66, total storage capacity, mechanical/electrical reliability and maintainability, and cost.

NFS 120, Hub 140

NFS 120 is a Network File Server. Such a device is well understood in conventional data networks as a file server capable of maintaining control over file storage on a network [Novell, Sun MicroSystems, Oracle] As Hub 100 is essentially a small private network, NFS 120 is employed to manage Online Archives 110 and 130. This is accomplished in conjunction with the Hub CPU 140. Hub CPU 140 also manages other functions, such as dynamic ODU configuration, Client assignment, Client audits and reporting and more [see upcoming section, "ODU Load-Leveling"]. The computations for LAP solutions are primarily carried out on the Hub CPU 140, although such processing may also be distributed to other nodes in some embodiments.

Control Bus 150, Data Bus 160

NFS 120, Online Archives 100 and 130 and Hub CPU 140 are interconnected via Control Bus 150. Through this bus, control of the system is implemented for control over system software, NFS 120, and Online Archives 110 and 130 as in a conventional file server well-known in data networks. Data, which in the case of the present invention is primarily program segments but which also includes system data and information such as account information, system commands, and system status data, is transferred between components via Data Bus 160. All of the primary storage and control components of Hub 100, namely Online Archive 110, NFS 120, Online Archive 130 and Hub CPU 140 are also connected to ODU 170 by both the Control Bus 150 and the Data Bus 160.

Online Distribution Units (ODUs) 170, 220, 222, 224

ODU 170 is the Online Distribution Unit and forms another layer of the store/forward ITVS architecture. It is this portion of Hub 100 which maintains direct communication with Clients 60 ... 66. This is accomplished via CSU/DSU 230, which acts as a high-speed modem and would be connected directly to the Telecommunications Clouds 50 of FIG. 1. The data rate and particular configuration of CSU/DSU 230 is determined by the services which Telecommunications Clouds 50 offers. If, for example, Telecommunications Clouds 50 is telephone system that offers DS3 service, CSU/DSU would be implemented using, for example, well-known 45 Mbit/second DS3-compatible hardware from the telephone industry.

Each ODU (170, 220, 222, 224) contains it's own dedicated Online Buffer 180 which contains the program segments currently in use by Client 60 . . . 66 as well as those determined for future need by the Look-Ahead Processing. The main task of each ODU is to act as a very responsive agent to provide seamless communications with its assigned set of Clients 60 . . . 66.

Controller 190, Router 200

Controller 190 and Router 200 are standard data-network components, such as those available from Retix of Santa Monica, Calif.

ODU load-leveling

It is anticipated that in a typical, large-scale ITVS, each Hub will serve many clients, numbering in the hundreds at least and very likely in the thousands. As such, one can quickly see that even with multiple ODUs at each Hub, as disclosed by ODUs 220, 222, and 224, each ODU will serve many clients. Recall that much of the system design is based on stochastic models to predict usage levels and dynamically assign network resources accordingly, and that a stochastic model requires a large sample base, which indeed is the case for the system design of the present invention. However, at the level of Hub 100, it is clear that demand may not be evenly distributed among the ODUs. Certain ODUs in a Hub may be flooded with User requests while others remain idle. For this reason, the system is designed to dynamically re-assign ODUs to serve particular Clients as needed, in a manner termed 'load-leveling'.

The Hub uses the knowledge and estimates of the Look-Ahead Processing discussed previously to predict the load at any given ODU. As old User-sessions end, each ODU monitors and predicts the usage at each Client 60 . . . 66. The preceding is an example, without limitation, of how distributed knowledge and control is used at every level in the described ITVS architecture. Hub 100 may dynamically assign and re-assign ODUs to particular clients to avoid bottlenecks and distribute the load as evenly as possible.

What is claimed is:

1. A system for distribution of interactive multimedia and linear programs comprising:
   at least one bunker, operatively connected to at least one data studio, for receiving and storing preprocessed multimedia program webs from said data studio, said data studio being operative for said design and/or production of said program webs which include control scripts to define presentation to the user and interaction with the user and processing engines to process content-dependent data as well as the multimedia data itself; and
   at least one hub connected to a communication network and connected to said bunker for selectively retrieving and storing said programs from said bunker and based on program web content proactively predicting needed data for distribution of said selected program webs using said communication network; and
   at least one client transceiver connected to said communications network for receiving, storing and selectively enabling a user to utilize said program webs;
   whereby multimedia program webs which include said presentation and interaction definitions, processing engines and multimedia data are prepared at said data studio, stored as online-ready files and segments in said bunker and said program webs are selectively accessbile for online distribution from the hub to the client transceiver via said communications network.

2. A system as in claim 1 whereby said Client transceiver is also operative for transmitting information representative of a request for one of said programs or program segments to said hub.

3. A system as in claim 1 whereby one or more additional Hubs are connected between said Hub and said communications network for further selective storing of said programs and segments.

4. A system as in claim 2 whereby said selective retrieving and storing at said Hub is responsive to said program request from said Client transceiver.

5. A system as in claim 4 further comprising Hub data processing means for processing look-ahead algorithms to predict said Client transceiver requests.

6. A system as in claim 5 further comprising Hub data processing means for collecting system usage information for use in said look-ahead algorithms.

7. A system as in claim 1 whereby said program distribution from said Hub to said Client transceiver is operative for transmission of segments of said program whereby said Hub storage is reduced by storing segments of said programs rather than the programs in their entirety.

8. A system as in claim 3 whereby storage of said program segments is distributed through one or more of said Hubs whereby the total inventory of said system is distributed throughout the system by the storage of said program segments at said multiple Hubs.

9. A system as in claim 1 whereby said program distribution from said Hub to said Client transceiver is operative for transmission of segments of said program whereby said Client storage is reduced by receiving segments of said programs rather than the programs in their entirety.

10. A system as in claim 1 further comprising segmentation of said programs into smaller program segments for storage at said Bunker, storage at said Hub and transmission from said Hub to said Client.

11. A system as in claim 10 whereby the transmission of said smaller program segments results in less latency in use of said program segment at said Client by virtue of the lesser transmission time of said program segments.

12. A system as in claim 10 whereby the next sequential program segment is transmitted to said Client prior to said Client's need for said program segment whereby program usage at said Client is maintained as a continuos, seamless program by timely reception of said program segments.

13. A system as in claim 10 whereby said program segments are preferentially stored at the system element closest to said Client, namely the closest Hub, followed preferentially by the closest possible Hub and then the Bunker whereby program segments required by the Client are satisfied by the closest possible node on the system.

14. A system as in claim 8 whereby said segmentation is determined by logical and symantical segmentation of said multimedia program webs representing user interaction with and containing said multimedia data.

15. A system as in claim 9 whereby said segmentation is determined by logical and symantical segmentation of said multimedia program webs representing user interaction with and containing said multimedia data.

16. A system as in claim 10 whereby said segmentation is determined by logical and symantical segmentation of said multimedia program webs representing user interaction with and containing said multimedia data.

17. A system as in claim 11 whereby said segmentation is determined by logical and symantical segmentation of said multimedia program webs representing user interaction with and containing said multimedia data.

18. A system as in claim 12 whereby said segmentation is determined by logical and symantical segmentation of said multimedia program webs representing user interaction with and containing said multimedia data.

19. A system as in claim 13 whereby said segmentation is determined by logical and symantical segmentation of said multimedia program webs representing user interaction with and containing said multimedia data.

20. A method for providing selective distribution and control of multimedia and linear programs over a communications network comprising the following steps:

processing the multimedia program comprising one or more of: compression, editing, and adding metadata, said metadata including information regarding file characteristics, content-dependent information and interactivity-related information; and transferring said processed multimedia programs to at least one bunker for offline storage; and selectively transferring said programs to at least one Hub for on-line storage; and receiving program requests at said Hub from a Client destination via a communications network; and transmitting said programs to one or more Client destinations via said communications network responsive to said requests; and receiving said programs for storage and viewing at one or more client destinations via said communications network.

21. A method as in claim 20 wherein said step of selective transferring of programs to said Hub is carried out by transferring segments of said programs.

\* \* \* \* \*